United States Patent
Rickert et al.

(10) Patent No.: US 8,433,663 B2
(45) Date of Patent: Apr. 30, 2013

(54) METHOD AND DEVICE FOR COMPUTER-AIDED PREDICTION OF INTENDED MOVEMENTS

(75) Inventors: Jörn Rickert, Freiburg (DE); Carsten Mehring, Freiburg (DE); Julie Blumberg, Freiburg (DE); Daniel Braun, Offenburg (DE); Tomislav Milekovic, Freiburg (DE); Jörg Fischer, Emmendingen (DE)

(73) Assignee: CorTec GmbH, Freiburg (DE)

( * ) Notice: Subject to any disclaimer, the term of this patent is extended or adjusted under 35 U.S.C. 154(b) by 396 days.

(21) Appl. No.: 12/665,992

(22) PCT Filed: Jun. 23, 2008

(86) PCT No.: PCT/EP2008/057978
§ 371 (c)(1),
(2), (4) Date: Jun. 29, 2010

(87) PCT Pub. No.: WO2009/000816
PCT Pub. Date: Dec. 31, 2008

(65) Prior Publication Data
US 2010/0274746 A1    Oct. 28, 2010

(30) Foreign Application Priority Data

Jun. 22, 2007   (DE) .......................... 10 2007 028 861

(51) Int. Cl.
G06F 15/18    (2006.01)
G06N 5/02     (2006.01)
A61F 2/48     (2006.01)

(52) U.S. Cl.
USPC ................................. 706/14; 623/24; 706/52

(58) Field of Classification Search .................... None
See application file for complete search history.

(56) References Cited

U.S. PATENT DOCUMENTS

| 7,392,079 B2* | 6/2008 | Donoghue et al. ............ 600/545 |
| 2003/0023319 A1 | 1/2003 | Andersen et al. |
| 2004/0054302 A1* | 3/2004 | Czernicki ..................... 600/586 |
| 2004/0073414 A1 | 4/2004 | Bienenstock et al. |

(Continued)

FOREIGN PATENT DOCUMENTS
WO    2007096269 A1    8/2007

OTHER PUBLICATIONS

Masiero, Quer, Rossi and Zorzi, "A Bayesian Analysis of Compressive Sensing Data Recovery in Wireless Sensor Networks" International Conference on Ultra Modern Telecommunicaitons & Workshops, 2009, IEEE, 2009, pp. 1-6.*

(Continued)

*Primary Examiner* — Kakali Chaki
*Assistant Examiner* — Walter Hanchak
(74) *Attorney, Agent, or Firm* — IP Strategies (57) ABSTRACT

Method and device for computer-aided prediction of intended movements from neuronal signals of a brain, wherein the neuronal signals are each associated in the brain with intended movements, wherein neuronal signals are recorded and the most probable movements are determined from these, specifically using a predetermined model in which a recorded neuronal signal and a determined movement are assigned to each other, and, for the probability with which a recorded neuronal signal corresponds to a respective predetermined movement, a predetermined distribution is assumed that is defined by specific characteristic values, wherein an adaptation of the neuronal signal is included in the predetermined model.

33 Claims, 8 Drawing Sheets

U.S. PATENT DOCUMENTS

| | | | |
|---|---|---|---|
| 2004/0267320 A1* | 12/2004 | Taylor et al. | 607/2 |
| 2005/0267597 A1* | 12/2005 | Flaherty et al. | 623/24 |
| 2007/0022068 A1 | 1/2007 | Linsker | |
| 2007/0031848 A1* | 2/2007 | Cargill et al. | 435/6 |
| 2007/0050046 A1* | 3/2007 | Georgopoulos | 623/24 |
| 2008/0208072 A1* | 8/2008 | Fadem et al. | 600/544 |
| 2011/0159467 A1* | 6/2011 | Peot et al. | 434/157 |

OTHER PUBLICATIONS

Ferrez and Milan, "Error-Related EEG Potentials Generated During Simulated Brain-Computer Interaction", IEEE Transactions on Biomedical Engineering, vol. 55, No. 3, Mar. 2008, pp. 923-929 . . . last revision on Submittal Jul. 21, 2007.*

Chow, Ferrer and Nesselroade, "An Unscented Kalman Filter Approach to the Estimation of Nonlinear Dynamical Systems Models", MultiVaritae Behavioural Research vol. 42(2), 2007, pp. 283-321.*

Krause, "Learning Probabilistic Networks", The Knowledge Engineering Review, vol. 13:4, 1998, pp. 321-351.*

Pezner, "Lecture Notes ST202 PDT1 MultiVariate Distribution", London School of Economics "http://stats.lse.ac.uk/penzer/ST202materials/PDTchpt4.pdff", 2006, pp. 16-20.*

Kroese, "A Short Introduction in Probability", University of Queensland, "http://www.maths.uq.edu.au/~kroese/asitp.pdf" 2009, pp. 1-127.*

Al-ani and Trad, Signal Processing and Classification Approaches for Brain-computer Interface, from the book: Intelligent and Biosensors as edited by Somerset, Jan. 2010, pp. 25-66.*

Igusa, "Regression and Correlation, Math 36b", Brandeis University, "http://people.brandeis.edu/~igusa/Math36bS09/Regression09.pdf", May 7, 2009, pp. 1-19.*

Blumberg. et al., "Adaptive Classification for Brain Computer Interfaces", Engineering in Medicine and Biology Society, 29th Annual International Conference of the IEEE, Aug. 1, 2007, pp. 2536-2539.

Bashashati, et al., "A Survey of Signal Processing Algorithms in Brain-Computer Interfaces Based on Electrical Brain Signals", Journal of Neural Engineering, Mar. 27, 2007, pp. R32-R57, vol. 4, No. 2, IOP Publishing Ltd., UK.

Wan, "Implementing Online Natural Gradient Learning: Problems and Solutions", IEEE Transactions on Neural Networks, Mar. 2006, pp. 317-329, vol. 10, No. 2; also abstract.

Shenoy, et al., "Towards Adaptive Classification for BCI", Journal of Neural Engineering, Mar. 1, 2006, pp. R13-R23, vol. 3, IOP Publishing Ltd., UK.

Parra, et al., "Response Error Correction—A Demonstration of Improved Human-Machine Performance Using Real-Time EEG Monitoring", IEEE Transactions on Neural Systems and Rehabilitation Engineering, Jun. 1, 2003, pp. 173-177, vol. 11, No. 2, IEEE Service Center, New York, NY, US; also abstract, Figs. 1-5, Table 1.

* cited by examiner

State of the Art

METHOD AND DEVICE FOR COMPUTER-AIDED PREDICTION OF INTENDED MOVEMENTS

FIELD OF THE INVENTION

The invention relates to a process and a device for computerized prevision of intended movements, as they are used in Brain Machine Interfaces (BMI).

BACKGROUND OF THE INVENTION

BMIs are a worldwide technology in course of development, which make possible the direct triggering of prostheses or technical devices by brain activity of a proband. The basic task of a motor BMI, to predict the intended movement from neuronal activity, classically is tried to be resolved by gauging a prevision model in a learning phase and following application of the prevision model on a virtual or real movement in an operational phase.

However, the basic supposition of this strategy is actually violated, i.e. that the neuronal activity would be stationary between training and operational phase or within the operational phase. On the contrary, the neuronal activity is dynamic even on relatively small time scales. Non-concluding reasons for this can be the plasticity of the brain (new interconnections, experience, ageing, . . . ), the cognitive state (attention, motivation, tiredness, time of day, change due to parallel activity, . . . ), differences between training and operating scenario (imagined compared to executed movement) or variability of derivation (small movements of the electrodes, change of the dielectricity of the gel (by hardening), with the help of which EEG-electrodes are applied, death of neurons in the case of single cell derivation, . . . ).

A precise and long-term stable prevision for reconstruction of conscious thoughts from the (in practice electric) brain signals in a BMI should be able to deal with these dynamics.

For the practical implementation of the derivation of the neuronal activity, a flexible foil is used that is tightly packed with miniature electrode contacts, implanted on the surface of selected areas of the cerebral cortex. The electric fields measured between the electrodes, resulting from the activity of groups of neurons (neuronal population activity), are fed into a multi-channel amplifier. The amplifier processes the neuronal signals of the single electrodes with high temporal resolution and delivers them in real time to a computerized system for signal processing. This system calculates from the nerve signals the action intention of the patient for certain trained voluntary movements that the patient can no longer execute himself. The calculated movement intention is then converted into a command signal, for example for an arm prosthetis or a computer cursor.

BRIEF SUMMARY OF THE INVENTION

In this context, it is the task of the invention to provide a process and a device for the prevision of movements that can be reliably adjusted to the dynamics of the neuronal activity during operation.

This task is performed by the processes or devices according to the independent claims. Advantageous improvements of the invention are defined in the dependent claims.

According to the invention, thus a process or an apparatus is provided for computerized prevision of intended movements from neuronal signals of a proband's brain, wherein the neuronal signals are in each case associated with the intended movements in the brain, wherein the most likely movements are determined on the basis of neuronal signals detected, namely using at least one model which describes a mapping of neuronal signals on the possible intended movements, wherein the process comprises:

a step, in which the at least one model is updated, the update being carried out using the detected neuronal signals and without knowledge of the intended movement, a step of the calculation of the at the moment most likely movement with the at least one updated model.

In a further embodiment of the invention, the mapping is additionally updated as to time by a neuronal error signal detected.

Depending on time, the mapping can depend, in addition to the neuronal signals, on the state of the proband, states being especially posture or attention.

The mapping can describe the probability of neuronal signals for the possible intended movements, wherein the at least one model performs an adaption of the neuronal signal that comprises the following before the updating step:

a step, in which the current probabilities, with which a presently detected neuronal signal corresponds to the respective possible movements, are estimated.

In the first step, an adaptation of the neuronal signal can enter into the calculation of the current probabilities, wherein the adaptation takes account of a detected neuronal error signal of the brain, which is generated in the proband's brain when the determined movement does not coincide with the intended movement.

The update of the mapping can take place by a regression process or by a classification process.

The basic idea of the invention is, to adapt the prevision model during operation, in order to compensate for the dynamics of the neuronal activity.

In a further embodiment of the invention, an error signal is additionally detected and included in the adaptation. In this way, the precision of the error signal comes into the play as a further parameter.

In a further embodiment of the invention, two types of prevision models are to be distinguished, which are called "classification" and "regression". Classification means assigning an activity vector to a determined discrete class ("right"-"left"). Regression means determining a continuous variable. The process used is the discriminant analysis for the classification and Kalman filter for the regression.

The inventors were able to show that the predictive value of an adaptive linear discriminant analysis (ALDA) can be increased considerably when the error signal is allowed for.

The Kalman filter, on the other hand, tries to estimate the probability distribution of the intended movement iteratively from the preceding neuronal activity data, and also lets the former movements flow in, due to the iteration. It thus does not "jump", but it makes reasonably continuous movements. The model is at first linear and twice Gaussian, it thus presumes normal distributions both for the noise of the deduced activity data and of the probability distribution of the movement to be predicted.

In order to implement "unsupervised learning", what is referred to as "augmented state space" is introduced as another embodiment of the invention, which, in addition to the movements, also includes tuning, thus the movement-selective activity function of the neurons. This tuning, or rather the respective tuning parameters, are thus comprised by the accordingly widened prevision model, which precisely makes up the adaptivity of the method.

In order to be able to grasp this mathematically, the Kalman filter is extended to non-linear cases, as known under the term of extended Kalman filter. An algorithmically manageable extension is known as unscented Kalman filter.

Furthermore, variants of the invention concern the following embodiments:

A non-linear neuronal model can be used, e.g. by means of the unscented Kalman filter.

Further models can be used additionally to the movement model F (state- and ambient model).

The error signal can be used for the optimized update of the tuning parameters. In the simplest case: if the prevision $X(t)$ was wrong and a neuronal error signal appeared afterwards, the update of the tuning parameter (in the neuronal model $p(X|Y)(t)$) will be revoked: $p(X|Y)(t)$ will be reset to $p(X|Y)(t-1)$. If an update takes place more frequently than the speed with which error signals occur, more than one update can also be revoked. In an extended case, in which the gravity of the error is contained in the error signal, the update can not only be revoked, but it can be performed anew in the reverse direction.

It is informed that the prevision model is basically independent of the technical kind of derivation of the brain activity (e.g. EEG, ECoG, LFP, SUA). Processes that leave the brain tissue intact are preferred, thus EEG or well-known flat ECoG electrodes are used. Accordingly, the "neuronal" signals Y and E represent (electronically processable) forms of the corresponding deduced brain activity and they exist outside of the human body. The neuronal signals Y and E thus contain the information of the deduced brain activity. However, they are not the brain activity itself. It is understood that the process of derivation of the brain activity from the human body is not part of the present invention, rather the invention refers to the processing of signals outside of the human body.

BRIEF DESCRIPTION OF THE DRAWINGS

The invention is described in more detail by means of the drawing.

The figures show:

FIG. 1*a* a process for the computerized prevision of intended movements according to the state of the art;

FIGS. 1*b, c* two variants of the inventive method for computerized prevision of intended movements;

DETAILED DESCRIPTION OF THE INVENTION

The processes and devices according to the invention can be carried out in a BMI, which on the entry side receives signals which represent the nerve activity of a proband. For this purpose, a thin foil with typically 32 electrode contacts implanted on the brain surface of the proband measures the nerve activity of a motor area. The 32 electrodes deliver the voltage difference between the 32 electrodes and a reference electrode to a computer system by means of a wireless transmission system and an amplifier. The detection of the signal on the brain surface of the proband and the transfer of the signal to the computer system are not part of the invention.

The voltage differences over time T form (per electrode) a noise-afflicted curve, thus a continuous signal. This signal contains both low (<10 hertz) and medium and high (>60 hertz) frequencies. The closer the electrodes are together, the more the signals of the two electrodes resemble, above all in their low-frequency components.

The information-carrying components of Y are then amplitudes and phases of selected frequency bands averaged over defined time intervals (e.g. 50 ms) e.g. amplitude and phase of approximately 1-5 hertz and amplitude of approximately 50-150 hertz. Additional information is contained in the correlations between the signals to of the electrodes, and in the deep- or bandpass-filtered raw signal averaged over defined time intervals (e.g. 50 ms).

In the computer system, the entering voltage differences are pre-processed in short continuous time intervals and reduced to the information-carrying components just described. A signal vector Y(t), which is to be evaluated, thus results from 32 voltage differences with a high time resolution.

This signal vector Y(t) thus contains the information on the movement intended, thus imagined by the proband. A signal vector Y(t) varies depending on a determined intended movement, e.g. as follows. In case of an (imaginary) movement to the left, the signal of one of the electrodes increases its amplitude in the 50-150 Hz band on average by 25%, in a movement to the right on average only by 10%. As the measured amplitude strongly oscillates around these averages in single cases, probabilistic models are often used: These declare, with which probability a—in this case—measured amplitude is to be assigned to a determined movement. These fluctuations of the measured values—despite equal imaginary movement—can be compensated by many electrodes and by time averaging.

Characteristic for neuronal signals is that the signal curves (in the case of equal intended movements) change over time. At a later date, said amplitude increases in a movement to the left on average only by 20%, and in a movement to the right only by 5%. This must be considered in the detection of the movement, so that the control still functions as well as before. In this respect, both slow, continuous changes and abrupt ones are known.

Figure 1:
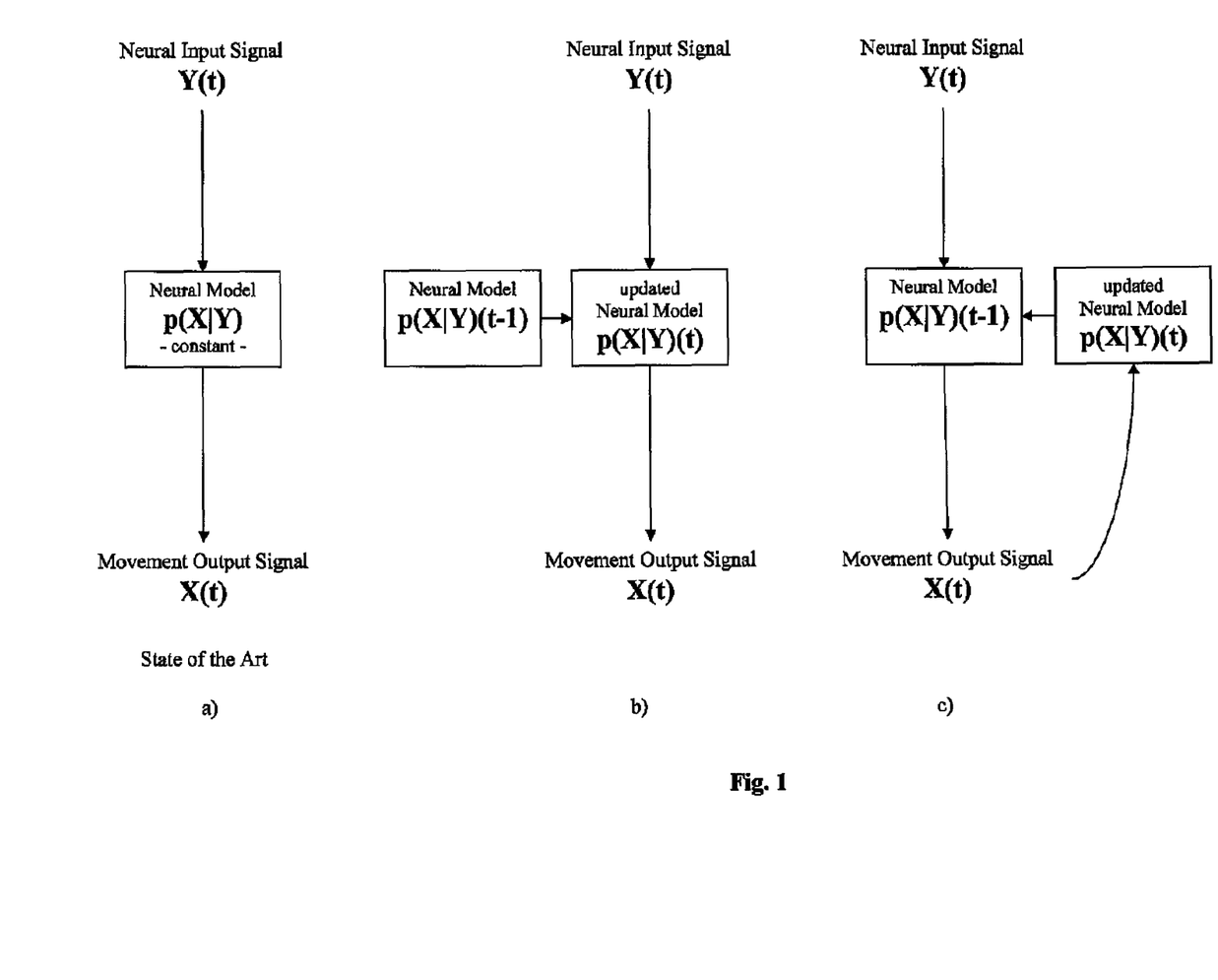

FIG. 1*a* illustrates a process for the computerized prevision of intended movements X from neuronal signals Y of a proband's brain according to the state of the art, in which the one neuronal model is constant during operation.

From a neuronal signal Y(t) at the entrance of the Brain Machine Interface (BMI), the intended movement X(t) is to be determined, thus decoded, by means of the model $p(X|Y)$ which describes the probabilities of the movements X, given the neuronal activities Y. The probability model $p(X|Y)$ is here a special form of the general model H, which describes a mapping of the amount of the detected neuronal signals Y on the amount of the intended movements X. The BMI is thus to deliver, at its exit, the movement signal X(t). This movement signal can serve for the activation of the corresponding prosthesis or the like.

FIGS. 1*b, c* illustrate two variants of the inventive method for computerized prevision of intended movements X from neuronal signals Y of a proband's brain with automated adaptation W of the model in operation over time T. In the case of the variant according to FIG. 1*b* the adaptation W of the model $p(X|Y)(t-1)$ takes place in every learning cycle each time before the decoding of the currently intended movement X(t), so that the intended movement X(t) is calculated with the already adapted model $p(X|Y)(t)$. In the case of the variant according to FIG. 1*c*, at first, in every cycle the intended movement X(t) is determined from the neuronal signal Y(t), namely on base of the model p(X|Y)(t−1) from the previous learning cycle, before the adaptation W of the model to p(X|Y)(t) takes place.

Figure 2:
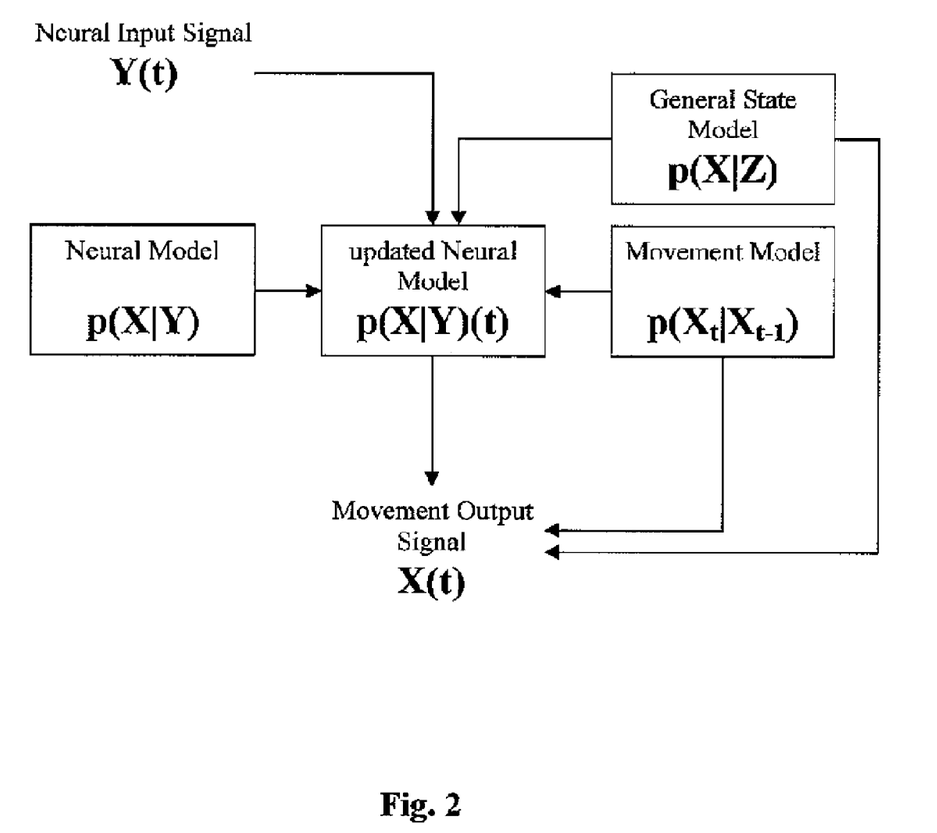
FIG. 2-4 further variants of the inventive method for computerized prevision of intended movements.

According to the invention, several prevision models (for X(t)) can be employed at the same time. FIG. 2 illustrates such a case, in which two further models are added to the neuronal model, i.e. a state model p(X|Z) and a movement model p(Xt|Xt−1).

Figure 3:
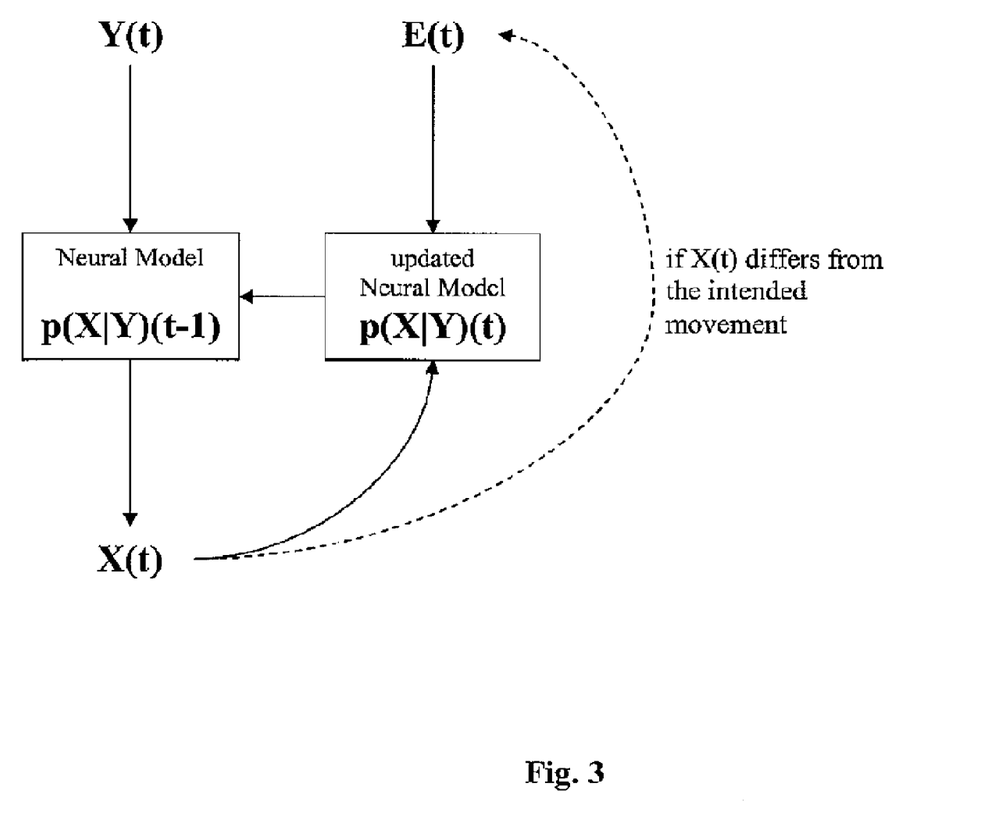

FIG. 3 illustrates another variant of the inventive method for computerized prevision of intended movements X from neuronal signals Y of a proband's brain with automated adaptation W of the model in operation over time T, namely by using an error signal E(t) generated in the proband's brain, if the determined movement does not coincide with the movement intended by the proband. Here, the neuronal model p(X|Y)(t−1) is updated each time by using the detected error signal E(t) to p(X|Y)(t). Here too, the adaptation can take place before or after the decoding, even if FIG. 3 only shows the case of the adaptation after the decoding.

Figure 4A:
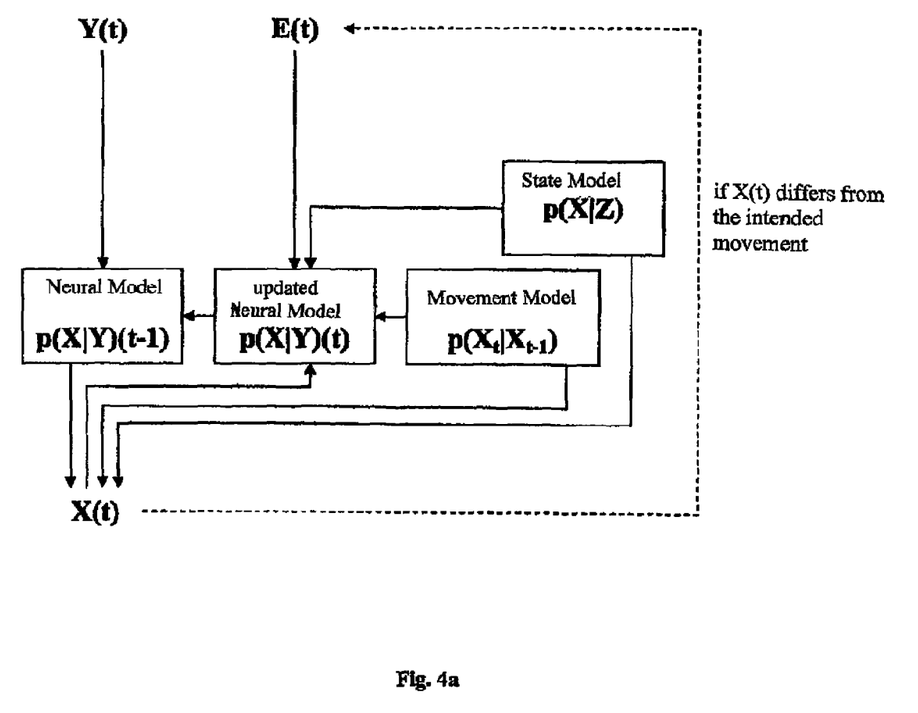

FIG. 4a illustrates a combination of the variants according to FIGS. 2 and 3, thus a process for the computerized prevision of intended movements X from neuronal signals Y of a proband's brain with additional models and automated adaptation W and using the error signal E(t). Here, the neuronal model p(X|Y)(t−1) is updated to p(X|Y)(t), each time using the detected error signal E(t). Moreover, a state model p(X|Z) and a movement model p(Xt|Xt−1) enter both into the motion prevision X(t) and into the adaptation of the neuronal model. Here, the adaptation can also take place each time before or after the decoding, even if FIG. 4a again only shows the case of the adaptation after the decoding.

A typical application of a BMI with the detection and evaluation of an error signal is the decoding of arm movements from electroencephalogram or electrocorticogram data. These are available to the BMI from measurements of the brain activity as electric signals Y(t).

The calibration of BMIs as a rule takes place under the conditions fixed by the laboratory (under supervision). The user there imagines repeated movements predetermined from outside. The brain signals Y(t) recorded, during each passage result in a training example (X, Y) that relates brain signals Y to a movement intention X. From a set of training examples, the mapping H (thus the neuronal model) is learnt. As the brain signals change as time passes, non-adaptive BMIs must be recalibrated under supervision at regular intervals.

According to the invention, this new calibration is evaded by the fact that an unattended, continuous adaptation of the mapping H is undertaken by means of neuronal error signals. These error signals contain information about if and how well the decoded movement corresponds to the real movement intention.

The error signal is used for the unattended generation of training examples,
the selection of suitable training examples and
the generation of a new decoding function H'.

The result is an informed search in the range of all possible decoding functions, which entails a clear acceleration of the adaptation.

Information Content of the Error Signal

Neuronal error signals are neuronal correlatives for how well a movement intention was decoded by a BMI. The information content of the decoded error signal can be binary or continuous. This information content decides on the kind of adaptation of the BMI and therewith on its adaptation speed. In the first case, a binary error signal is decoded from the user's brain signals. This error signal only indicates if a decoding (X, Y) was wrong (E=false) or was correct (E=true).

Here it is assumed that a decoding (X, Y) is wrong if the decoded movement intention X and the real movement intention $\hat{X}$ distinguish by more than a fixed threshold value c with respect to an error measure δ.

Example

The BMI decodes two-dimensional velocity directions X=(v_x, v_y). A constant speed, e.g. |X|=1, is assumed. The angle between the decoded movement direction X and the movement direction actually intended $\hat{X}$ is used as the error measure δ. Every time the angular error is greater than e.g. ∈=15°, an error signal E is generated.

This error signal is binary.

A binary error signal contains less information than the now described continuous to error signal. A continuous error signal contains a gradual indication on how wrong or correct an (X, Y) pair is. Without loss of generality, this can be expressed by a value $e=IR_0^+$. The smaller e, the more correct was the decoding (X, Y). The smallest value for e is 0, which means that the decoded movement intention coincides with the real one.

Example

If, under the same marginal conditions as in the previous example, a continuous error signal is used, then e will become larger with increasing angular errors.

Generation of Training Examples

In supervised learning, training examples are preset, i.e. it is known what the intended movement $\hat{X}$ to a brain signal Y is. This information is not given in the case present here.

The process described in this section generates training examples ($\tilde{X}$, Y, E) from (X, Y, E) triples that are used for the selection and for the automatic generation of a new decoding function H'.

If a binary error signal is used, it is assumed that the decoding is correct in the case of (X, Y)-pairs in which no error signal was generated. In this case, $\tilde{X}$=X is chosen. If an error signal δ was generated, it is assumed that X and its surroundings with respect to δ do not correspond to the intended movement. Every other actual direction has a priori the same probability to be the intended direction $\hat{X}$. $\tilde{X}$ can be selected at random or following a fixed prescription. However, the condition δ(X, $\tilde{X}$)>∈ must be fulfilled. Presumably, $\tilde{X}$ is not the right $\hat{X}$, but at all events, it is a better choice than X.

Example

Under the same marginal conditions as in the previous example (X, Y, false), a triple is assumed, in which an error signal was generated. Every movement direction that has an angle of more than ∈=15° as to X can be selected as $\tilde{X}$. A possibility would be $\tilde{X}$=−X.

In the case of a continuous error signal, the threshold ∈ is extended with increasing error signal E. Otherwise, the procedure is the same as in the binary case.

Selection of the Training Examples

From a set of generated training examples ($\tilde{X}$, Y, E), the examples that are used for generating the new mapping H' are selected in the next step. Now, it is also clear why the error signal e was added to the training examples: the error signal is used for an evaluation of the training examples. In the event of a binary error signal, training examples in which the error signal was not generated (E=true) are taken first. The reason for this is that these training examples contain more information than the others with e=false.

Example

In the current example the brain signal Y was measured, and now the movement direction X contained in Y is searched for. The statement ((12, 17), true) contributes to indicate on what the mapping H is to map the brain signal Y. This cannot be deduced directly from the assertions ((34,3), Y, false) and ((1, 5) Y, false) and ((12, 45), Y, false).

In the case of a continuous error signal, the training examples are sorted by increasing error signals. In this way training examples with a smaller error are preferred.
Generation of a New Mapping H as a Decoding Function Let $r>n$ and $\{\tilde{X}\_i, E\_i\}$ be a set of selected training examples with N as the dimension of X, thus $X \in \mathbb{R}^n$. A mapping M can be calculated from this set with the help of the least square method (least square fit), which minimizes the error for the equations $\forall i \in 1, 2, \ldots r: Y_i = M\tilde{X}i$.

If the neuronal model is H a linear function, the new mapping H' can be formed according to the rule H'=H+α(H−M), wherein $\alpha \in \mathbb{R}$ a is parameter for the increment of the adaptation.

The decoding of the movement intentions can take place by regression processes e.g. (by means of a Kalman filter) and by classification processes. Regression processes decode continuous movement intentions. A result is e.g. (235,−13), which means in the example mentioned above "move the cursor by 235 pixels to the right and by 13 pixels downwards". In the case of classification processes, the movement intention is mapped with the decoding on few classes, e.g. up, down, to the left and to the right.

In the following, an embodiment for a regression process and an embodiment for a classification process are described.
Kalman Embodiment A method elaborated and successfully tested by inventors in computer simulations is a variant of the Kalman filter, specialized on brain signals (adaptation), which are variable according to their reference to movement—or more generally, of the particulate filter. In the following description, the reconstruction of an arm movement (X) from the brain activity (Y) is used as an example.

The use of Kalman filters for neuronal networks is generally described in Simon Haykin's "Kalman Filtering and Neural Networks", John Wiley & Sons, New York 2001.

The Kalman filter estimates the intended arm movement X(t) from a sequence of measurements of neuronal signals Y(t) that may be noisy.

Other application examples refer to the reconstruction of feelings (e.g. hunger/thirst, affection/dislike), language or pictures. This can be mathematically described as follows.

The neuronal signals Y are described as a function H that depends on the adaptive/variable tuning parameters W(t) and the movement X(t) plus noise Ny (neuronal model), $$Y(t)=H(W(t),X(t))+Ny.$$

The movement X at the moment T is described as function F plus noise Nx, $$X(t)=F(X(t-1))+Nx.$$

The variables X(t−1) and X(t) are the movement at the moments t−1 (last determined movement) or T (movement currently to be detected). The movement X(t) can be derived from the previous movement X(t−1), by applying the linear mapping F on X(t−1) and by adding the noise term Nx. This is the movement model used as a basis.

In the non-adaptive case, this is used solely. In the adaptive case, it is extended (see below).

The measurements Y(t) and the state X(t), estimated from X(t−1) with the state model, are related to each other by the neuronal model: this uses the estimated state X(t) for estimating the measured values Y(t). An estimate of the current Y(t) thus results from the state X(t), mapped for example by a linear mapping H—and from a noise term Nx(t). The trick of the Kalman filter is, to compare the estimate of the current measured values Y'(t) with the Y(t) actually measured and to detect the most likely movement X(t), with the aid of the most likely movement X'(t), according to the movement model. Mathematically, this is X(t)=x'(t)+K*(Y(t)−Y'(t)), wherein K is the Kalman factor. For closer details see the application example: cursor control by an adaptive regression below.

In order to consider the adaptation, not only the movement X(t) is estimated, but X is here extended by the tuning parameters W of the function H, so that X_erweitert (X_extended) (t)=[X(t),W(t)] applies. Moreover, Nx is extended by the noise of the tuning parameter W (Nx becomes Nx_erweitert (Nx_extended)=[Nx, Nw], wherein Nx describes the noise of the movement model and Nw the noise of the neuronal tuning parameters). Moreover, F is extended to F_erweitert (F_extended)=[Fx,Fw], wherein Fx describes the movement model and Fw the model of the adaptation of the tuning parameters. These extensions are also indicated as "augmented state space". Another possibility to consider the adaptation is the introduction of a second Kalman filter, which estimates the tuning parameters W(t). This filter runs separately from the first Kalman filter that uses the estimated W(t) in its function H.

In the simplest case, the function Fw only maps the identity. That means, the parameters W are modified only by the noise Nx. The described approach is, however, designed in such a way that it works for any models which describe how the tuning parameters change over time—if the model is known, it can be used directly in the Kalman filter. If the model is unknown, it must be replaced by another model, in the simplest way by the identity plus noise. Apart from the model knowledge Fw, a good knowledge of Nw is also important for a good functioning, especially if Fw is unknown. What helps, if Nw is unknown or is not exactly known, is a gradual adaptation of Nx_erweitert to a new estimate of this matrix by a Robbins-Monroe approximation. This method assumes that the covariance of the Kalman update model is equal to the current model:

$$Nw\_update(t)=Kw*[Y(t)-Y'(t)]*Kw^T*[Y(t)-Y'(t)]^T,$$

wherein Kw is the lower right part of the Kalman gain, which corresponds to Nw (Kw=K(i,j) with i,j=d1+1, d1+2, ..., d1+d2, wherein d1 is the dimensionality of Nx and d2 of Nw), and Y'(t) the current estimate Y by the Kalman filter (Y'(t)=H (X'(t)). Instead of now directly using the Nw_update(t), the Nw used in the Kalman filter is slowly adapted to the Nw_update:

$$Nw(t)=(1-a)*Nw(t)+a*Nw\_update(t),$$

wherein a is the step size of the adaptation, selected between 0 (no adaptation) and 1 (immediate adaptation).

Figure 4B:
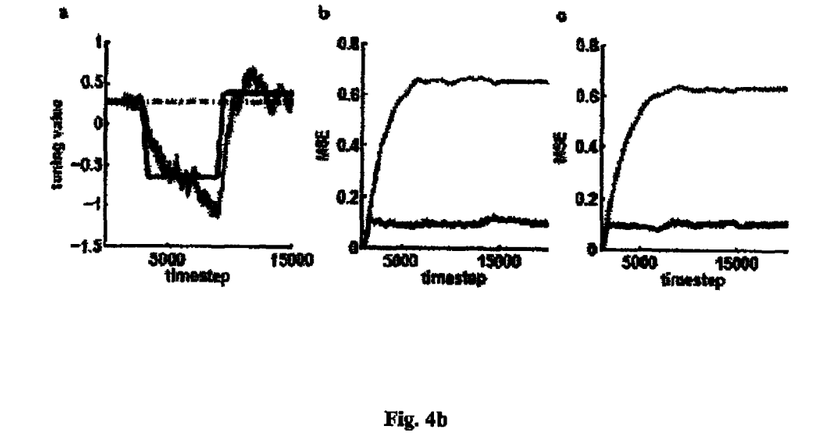

FIG. 4b shows the estimate of neuronal tuning parameters. In the graph on the left, the black curve indicates the value of a simulated tuning parameter over time. The grey continuous curve indicates the estimate of this tuning parameter for decoding in the case of an adaptive Kalman filter, whereas the grey dashed curve indicates the estimate by a Kalman filter without adaptation, which stops at the once detected estimate.

The illustration in the middle shows the middle square error (MSE) between the simulated tuning parameters and the estimate by the Kalman filters during 2D movements (2 tuning parameters per neuron), adaptive Kalman filter in black, Kalman filter without adaptation in grey. Each time, the data was calculated for 50 steps (time steps), and then averaged by the 50 steps. The curve on the right shows the same for 3D movements (3 tuning parameters per neuron). It is well recognizable that the Kalman filter with adaptation shows an almost constantly small MSE, whereas the Kalman filter without adaptation delivers deteriorating estimates with increasing time.

In addition, it is useful to limit the estimate of W(t) to physiologically realistic boundary conditions during operation, in order to increase the precision of the adaptive Kalman filter. Maximums and minimums for the single values of W thus have to be introduced, in order to prevent that the adaptive Kalman filter exceeds a physiologically plausible range in its estimate.

Illustration of the quality of the estimate precision of the adaptive Kalman filter: The Kalman filter thus calculates, with the aid of the models F and H, the most likely movement X at a moment T, given the measured neuronal signals Y. If the parameters W were not considered by H, with progressive change of W, with the passing of time H would become increasingly inexact and the calculation of the movement would also become increasingly inexact as a result. This is illustrated with regard to FIG. 5.

Figure 5:
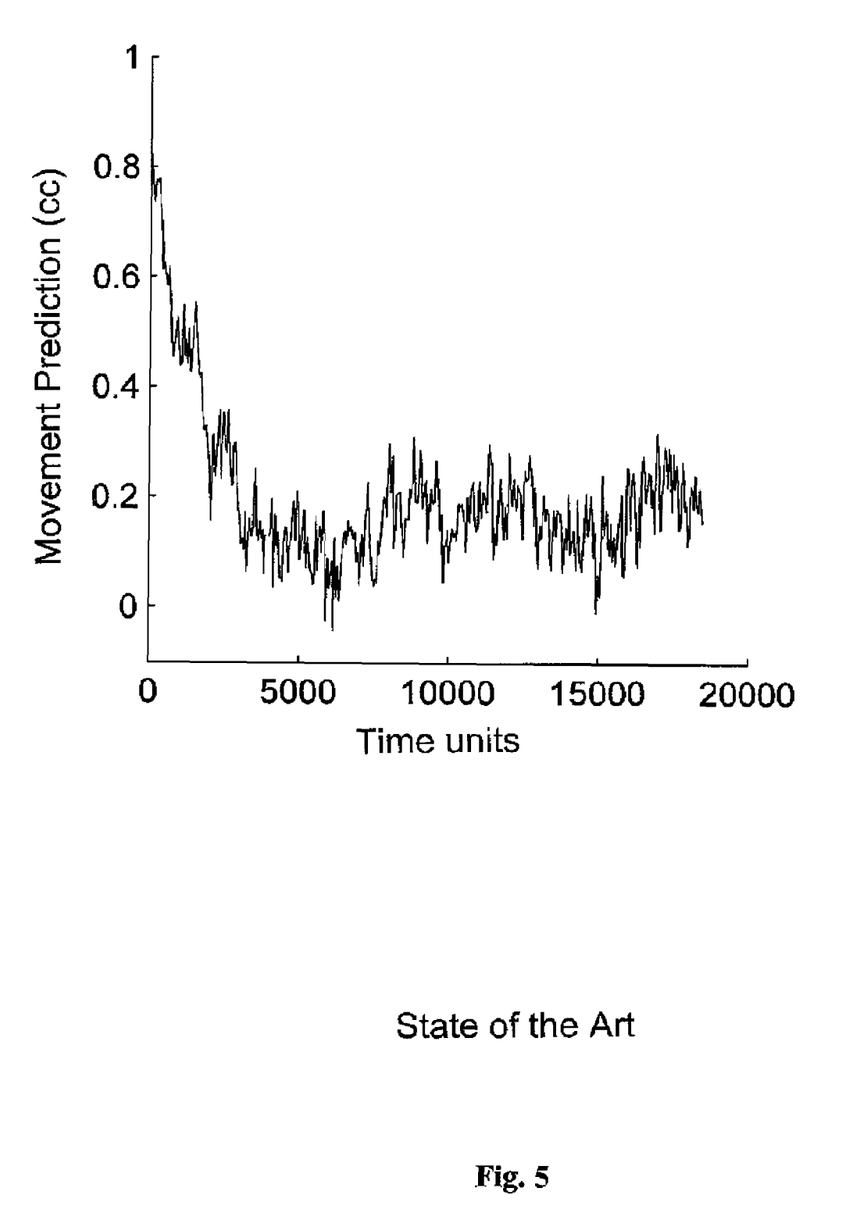
FIG. 5 the decoding ability (performance) of a BMI with Kalman filter without adaptation according to the state of the art.

The curve represented in FIG. 5 shows the means over 20 simulation runs (thus the success probability for the movement previsions) of a BMI with Kalman filter without adaptation (W=0), thus according to the state of the art, for random targeted movements on a 2-dimensional screen as a movement model and a linear position tuning (the tuning parameters W of which vary over time) as a neuronal model H. As can be seen, the success probability sinks rapidly over time.

Figure 6:
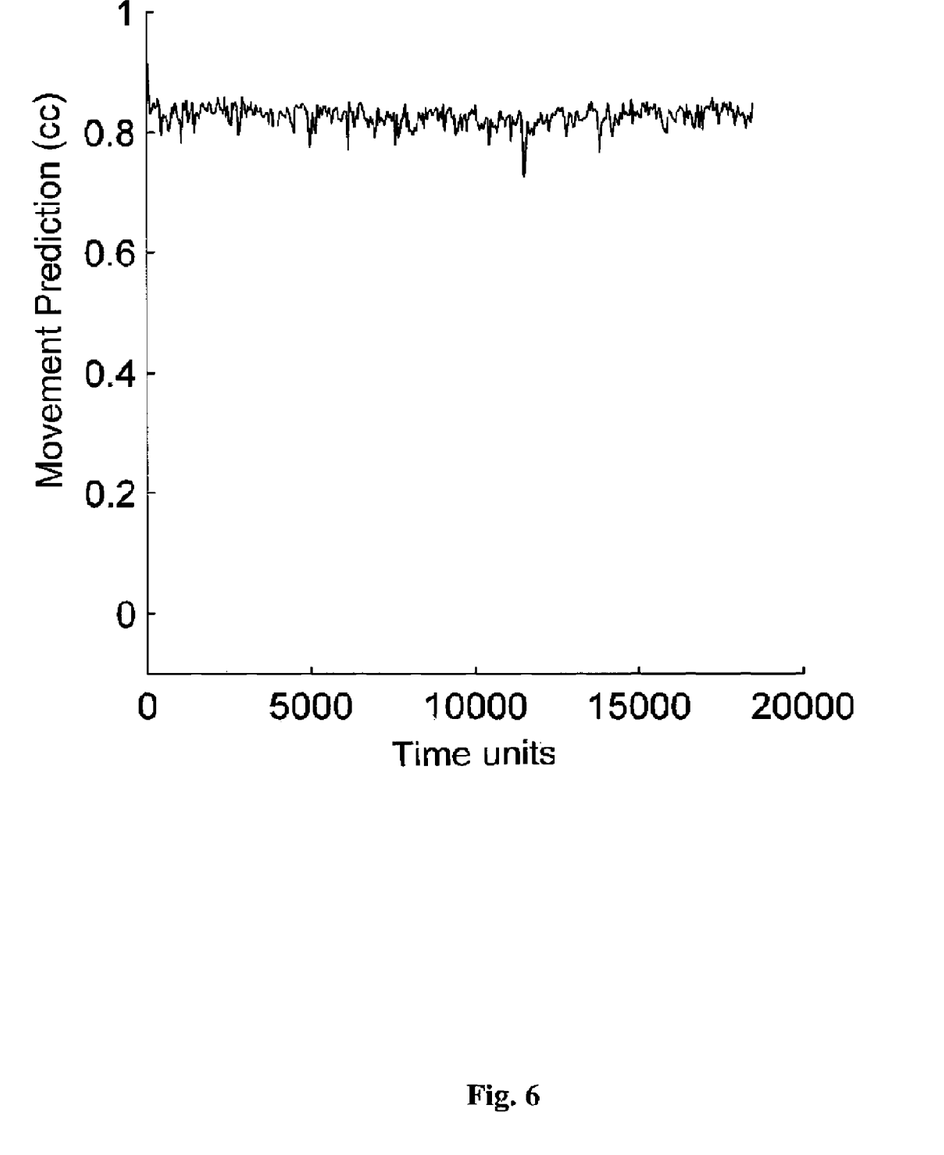
FIG. 6 the decoding ability (performance) of a BMI with Kalman filter with adaptation according to the invention.

If, however, a Kalman filter according to the invention with adaptation of the neuronal tuning is used, the success probability (performance) of the BMI constantly remains high. Thus, to avoid a drifting of the model, the Kalman filter estimates the parameters of the function H in addition to the movement X. In this way, the method can react autonomously to changes of brain activity. It is an independent learning without any aid from the outside. FIG. 6 shows the stable performance of the BMI with a Kalman filter with adaptation (W=real adaptation of the neuronal tuning) in for the rest equal conditions to those in the constellation according to FIG. 5. As can be seen, the quality of the movement prevision remains obtained over time, if it is over 0.8.

The Adaptive Kalman Filter with Evaluation of Error Signals

While the Kalman filter is working, the estimated states X(t), the measured values Y(t), and optionally the error signals E(t) are recorded at each moment t. With these training examples it is possible to generate an adapted observation model H'. After that, it is tested, which of the two models decodes better.

Better decoding means less error signals per iteration. For this purpose, a threshold value is defined. In every iteration, the current error signal is added to a sum s. In the case of a binary error signal, 1 is added to s—if there is an error—otherwise 0. For a continuous error signal e, e is added directly to s. If the number of the counted error signals exceeds the threshold value, it is recorded how many iterations were necessary to exceed this threshold. If H' took longer, H is rejected and H' is used as a new adapted H in the measurement model. Otherwise, H is used further on. This procedure is repeated, in order to reach a continuous adaptation of the Kalman filter.

In this example, a threshold value of 500 is selected and the error signal is binary. Now brain signals Y(t) are decoded by means of a Kalman filter (using H), until 500 error signals were measured after 873 iterations of the Kalman filter. A candidate H' is generated from the training examples. Then the Kalman filter decodes with H' and reaches the threshold of 500 error signals after 1023 iterations. As H' generates less errors per iteration than H, H is rejected and H' is used instead.

Application Example: Cursor Control by an Adaptive Regression

A severely paralyzed patient, who can no longer use his speech muscles either, has learnt to control a computer cursor by his brain signals. As described in application example 1, the nerve activity of a motor area is measured in the form of voltage differences and transferred to a computer system. There, the entering voltage differences are pre-processed immediately as in application example 1 and converted into a signal vector Y.

It is the goal to estimate from Y the direction of the cursor speed X, e.g. X=(0.2588, 0.9659), which means, "move the cursor to the right with the speed of 0.2588 and to the top with 0.9659".

The estimate of the current velocity direction X(t) is carried out by a Kalman filter.

For estimating the velocity direction, the Kalman filter needs a neuronal model that relates the measured signal vectors Y to the cursor speed, here, Y(t)=H(W(t), X(t))+Ny is used. In order to deduce the current velocity direction from the most recently known velocity direction X(t−1), the movement model F (X(t)=F(X(t−1))+Nx is used. It forms the state X(t−1) one timestep into the future and adds the noise term Nx to this. The noise term allows for the fact that the prevision by F can be inexact. The more detailed the prevision, the smaller Nx. The movement measurement model does not use the currently measured signal vector Y(t) for the prevision. Only the Kalman filter combines both models for a robust estimate of X(t).

The neuronal model H is generated from a training data set by the user performing repeated predetermined movement sequences. In this concrete case, H(W(t), X(t)) is a linear mapping, thus a 2×32 matrix H=($h_{i,j}$). It maps the 32 voltage differences from the signal vector Y on a two-dimensional velocity direction. The calculation of the neuronal model can take place e.g. with least square fit.

During operation, the estimate of the velocity direction takes place each time a new signal vector is Y(t) measured. The Kalman filter takes the most recently estimated velocity direction X(t−1) as well as Y(t) and calculates the current velocity direction X(t) from this. In order to do this, the Kalman filter first calculates an a priori estimate X−(t) with the movement measurement model, then inserts X−(t) into the neuronal model and thus obtains an a priori estimate of Y−(t). A posteriori estimate X(t) is formed with the help of a comparison of the real signal vector Y(t) and Y−(t) over a weighted sum. The weighting factor is the so-called "Kalman gain". If the a priori estimate X−(t) is considered more probable, i.e. when the insecurity with respect to the estimated X−(t) is smaller than the insecurity of the movement direction implied by Y(t), X−(t) has a more important part in X(t). Otherwise, the movement direction implied by Y(t) will have a more important part in X(t). The neuronal model H quickly loses its accuracy, due to the dynamics of the neuronal activity described at the beginning. The real tuning parameters, which are unknown to the computer system, change, and the estimate of X increasingly deteriorates. For this reason, the tuning parameters W of the computer system must be adapted. One possibility to do this is to also estimate W(t) in addition to X(t).

The "augmented" Kalman filter described above extends the state X(t) to be estimated by the tuning parameters W(t). This means that the tuning parameters are estimated by the Kalman filter and are used in the neuronal model at the same time. In a simple version, the tuning parameters W(t) correspond to the coefficients $h_{i,j}$ of H. The corresponding movement measurement model is extended in such a way that it slightly and at random modifies the tuning parameters contained in X(t) during the calculation of the a priori estimate X−(t). If the modified tuning parameters are more suitable, they have a more important part in the weighted sum for calculating the a posteriori estimation X(t).

Another possibility is to estimate W(t) by error-signal-controlled adaptation.

The error signals E recorded are here at the same time a measure for the quality of the tuning parameters $W_{alt}$ ($W_{old}$). If the tuning parameters W(t) correspond to the coefficients $h_{i,j}$, it can e.g. be proceeded as follows: When $W_{alt}$ has generated more than γ=500 error signals, the time lapse of $\tau_{alt}$ ($\tau_{old}$) is) i recorded which $W_{alt}$ needed in order to generate these 500 error signals. In order to generate new tuning parameters $W_{neu}$ ($W_{new}$), the recorded (X(t),Y(t),E(t)) triples are converted first into training examples. If the error signal of a triple indicates a wrong estimate of X(t), the training example (−X(t),Y(t),E(t)) is generated from this. In a correct estimate, the triple is used unchanged as a training example. After that, all the training examples are used in order to calculate the tuning parameters $W_{neu}$ by means of least square fit. Afterwards, $W_{neu}$ is used for the decoding in the neuronal model. It is now necessary to find out if $W_{neu}$ decodes better than $W_{alt}$. Again, X(t), Y(t) and E(t) are recorded and the moment $\tau_{neu}$ is determined, at which the error signal threshold γ is exceeded. If $\tau_{neu} > \tau_{alt}$ applies, $W_{neu}$ will be maintained, i.e. $W_{neu}$ will replace $W_{alt}$. The process of adaptation is continued during the whole operation of the BMI.

During the combination of the adaptation of W(t) with an "augmented" Kalman filter and the error-signal-commanded adaptation, the two adaptive processes take place in a time-shared way. In every time step, thus in every estimate of X(t), the "augmented" Kalman filter W(t) adapts a bit. If error signals still occur, the error-signal-controlled adaptation generates accordingly corrected tuning parameters $W_{neu}$ in greater time intervals.

As a second embodiment, a prevision model is described, which comprises an adaptive classification using the error signal. The classification used here is the linear discriminant analysis (LDA). A linear classifier generates a hyperplane, which divides the signal space into single subspaces for the single classes. In the binary case for example the decision rule is that a given signal vector (Y) belongs to the class (movement) $X_1$, rather than to the class (movement) $X_2$:

$$p(X_1|Y) > p(X_2|Y)$$

The probabilities can be determined according to the Bayes rules as follows:

$$p(X_k \mid Y) = \frac{p(X_k)p(Y \mid X_k)}{p(Y)}$$

with $p(X_k)$ as the probability for class k and $p(Y|X_k)$ as class distribution.

Assuming that all classes of a priori are equally probable, p(c_k)=const, the calculation of the decision rules mentioned above is reduced to:

$$p(Y|X_1) > p(Y|X_2)$$

In the case of the LDA, a multivariate Gaussian distribution is assumed:

$$p(Y \mid X_k) = \frac{1}{\sqrt{(2\pi)^f \det(C)}} \exp\left(-\frac{1}{2}(Y - \mu_k)^T C^{-1}(Y - \mu_k)\right)$$

in which Y is the vector to be classified (thus the neuronal signal), f the dimension of the neuronal signal Y, C the covariance matrix for all classes (thus movements), $\mu_k$ the average of the k-th class (movement).

The adaptive LDA (ALDA) functions as follows. The initial data distributions for the different classes are estimated using data from a supervised learning phase (e.g. LDA). In every feed-back step, the discriminative condition is updated, namely in a two-step process. In the first step, the current probability of the expected value is estimated using Gaussian distributions for the K classes:

$$p(X_k \mid Y) = \frac{p(X_k)p(Y \mid X_k)}{\sum_{k=1}^{K} p(Y \mid X_k)p(X_k)}.$$

In the second step, the resulting probability of the expected value is used for updating the average of the classes, each time calculated from the most recent N vectors $Y_i$ and their classes $$\mu_k = \frac{1}{p(X_k)N} \sum_{i=1}^{N} p(X_k \mid Y_i) Y_i$$

The covariance matrix C is updated as follows:

$$C = \frac{1}{N-1} \sum_{k=1}^{K} \sum_{i=1}^{N} p(X_k \mid Y_i)(Y_i - \mu_k)((Y_i - \mu_k)^T$$

For each further measuring data set and its estimated probabilities, the oldest of the learning data sets is replaced, which corresponds to a moved window which updates the learning data set for the classifier.

In a further variant according to the invention, referred to as ALDEC, an additional neuronal signal is evaluated, namely an error signal E. This error signal corresponds to a brain activity that can be measured in case the proband's action was not interpreted correctly by the computer, i.e. the movement intended by the proband does not coincide with the movement detected and/or accomplished by the computer.

When including the error signal E, the following results are achieved for the aforementioned equations:

$$p(X_k \mid Y, E) = \frac{p(X_k)p(Y, E \mid X_k)}{p(Y, E)}$$

and, if the signals are independent of each other:

$$p(X_k \mid Y, E) = \frac{p(X_k)}{p(Y, E)} p(Y \mid X_k) p(E \mid X_k).$$

In the ideal case that every error is detected, for the distribution of the error signal, which depends on the class X_k and the estimated class X_est, the following applies:

$$p(E \mid X_k) = \begin{cases} 1 & \text{für } X_k \neq X_{est} \\ 0 & \text{für } X_k = X_{est} \end{cases}.$$

The reliability R of the error signal can be used in a more differentiated way. It indicates, with which probability an error signal is measured, if decoded and real class do not coincide. With this reliability, the probability obtained from the error signal can be weighted, before the probability calculated by the normal adaptive method is updated with it, namely according to the following calculation rule:

$$p_{total}(X_k \mid Y, E) = \frac{p_{error}(X_k \mid Y, E) p(X_k \mid Y, E)}{\sum_{k=1}^{K} p_{error}(X_k \mid Y, E) p(X_k \mid Y, E)}$$

If no error is detected with a reliability R and the detected movement is (class) $X_k$, the probability 1−R "distributes" on the rest of the N X movements (classes) $X_{rest}$.

$$p_{error}(X_k \mid Y, E) = R, \quad p_{error}(X_{Rest} \mid Y, E) = \frac{1-R}{nC-1}$$

If, however, an error is detected, the probability of this movement is:

$$p_{error}(X_k \mid Y, E) = 1 - R, \quad p_{error}(X_{Rest} \mid Y, E) = \frac{R}{nC-1}$$

In the following, the symmetric case is assumed that this probability is equal to the probability that no error is detected, if no error has occurred. Then, the probability that no classification error occurs is equal to the decoding ability DP. Thus the following probabilities result:

|  | Error occurred | No error occurred |
| --- | --- | --- |
| Error detected | (1 − DP)R | DP(1 − R) |
| No error detected | (1 − DP)(1 − R) | (1 − DP) R |

Figure 7:
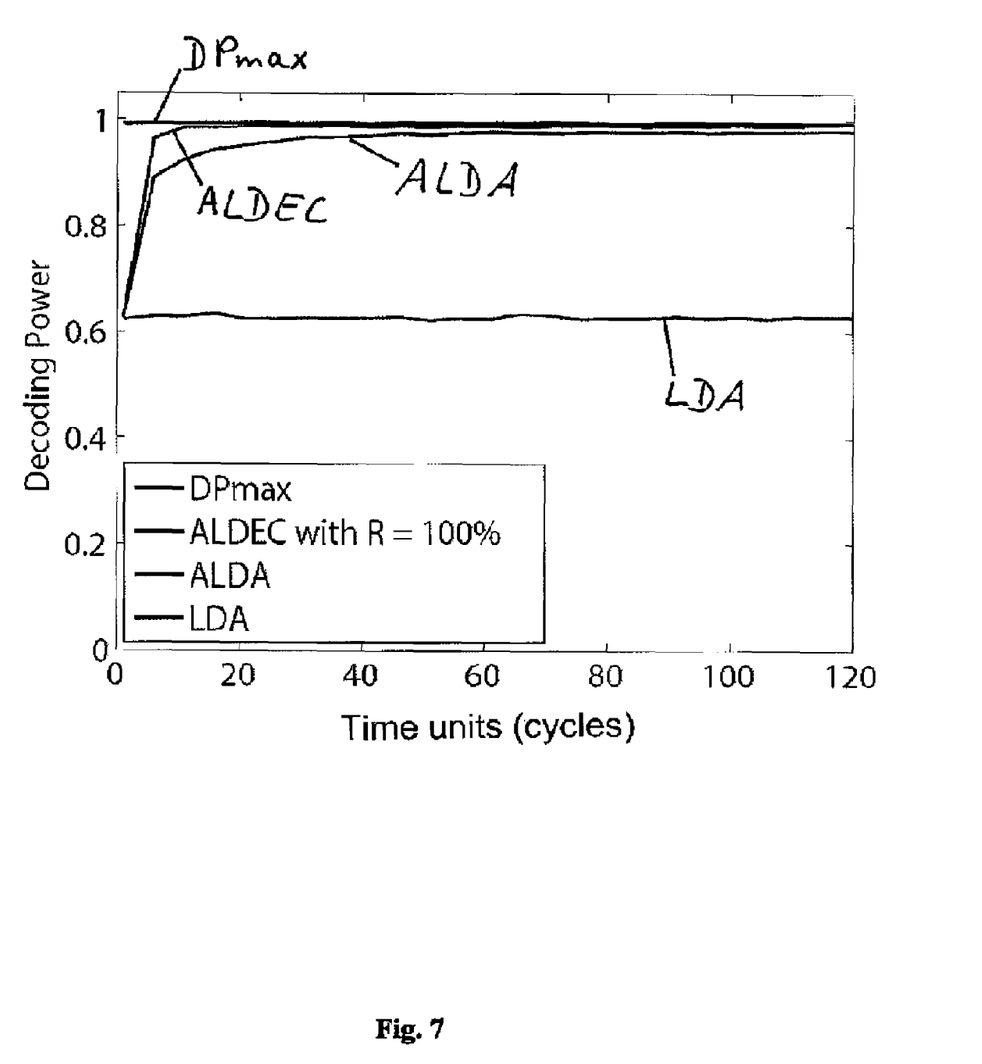
FIGS. 7 and 8 confrontations of the decoding ability of various processes.

FIG. 7 compares the performance of various of the processes described before. The performance was found out by means of simulations. At first, thus before the moment of the recording, the model was taught. Afterwards, the averages of the movement distribution (class distribution) were shifted uniformly, by which the dynamics of the neuronal activity described in the introduction is simulated.

While the LDA process according to state of the art (thus without adaptation) practically cannot follow the change in the subsequent learning cycles, this is possible with the adaptive model ALDA already after few learning cycles. With the adaptive module ALDEC, which exploits the neuronal error signal (with R=100%), the adaptation is even faster and reaches an even higher value. For comparison, the maximum decoding ability DPmax, which is 1, is indicated.

Figure 8:
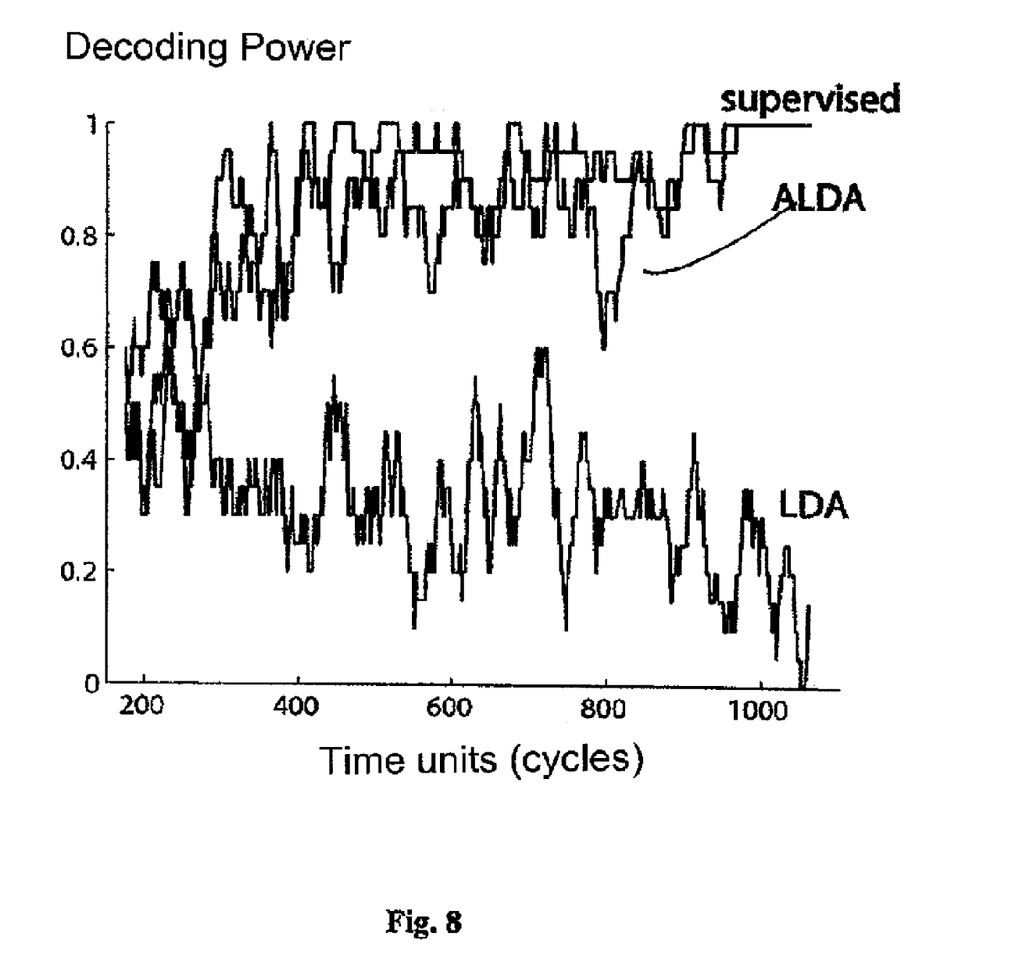

FIG. 8 represents the results in the processing of real non-stationary data. The data comes from a data record that was obtained with a BMI on EEC basis. The data concerns two movements or (classes), i.e. left hand, right hand. The first 200 learning cycles of the record were used in order to teach an LDA model (thus without adaptation). For the following learning cycles, three models were compared, namely LDA according to the state of the art, ALDA with an update after each learning step and supervised ALDA.

The curves show the decoding ability DP of the single processes depending on time. As can be seen, the decoding ability of the LDA method deteriorates again over time, whereas the ALDA-process adapts to the changes. Supervised ALDA, i.e. learning with manual correction of the model, obviously reaches the best values for decoding ability, cf. the curve "supervised".

Application Example, Keyboard Control by an Adaptive Classification

A severely paralyzed patient, who can no longer use his speech muscles, has learnt to control a computer keyboard, which is suitable for patients, by his brain signals: A thin foil with electrode contacts implanted on the brain surface measures the nerve activity of a motor area. The electrodes transfer the voltage differences between the single electrodes and a reference electrode, by means of a wireless transmission system and an amplifier, to a computer system.

There, the entering voltage differences are pre-processed in short continuous time intervals and reduced to the information-carrying components. In this way, a signal vector Y to be classified results from the voltage differences with a high time resolution. By comparison with a reference or training data record $Y_{ref}$, the classifier Y implemented in the computer system assigns the most likely key X to the computer keyboard. A fast and well functioning classifier for this purpose is the linear discriminant analysis.

The reference data record is initially formed once by the preset selection of all keys $X_k$: the nerve activities $Y_{raw}$ recorded during this process are thus, assigned correctly, recorded several times for each key selection $X_k$. After determining the information-carrying components, these assignment pairs are at the classifier's disposal. In the case of the linear discriminant analysis in the form of a Gaussian distribution of the information-carrying components for every key. The Gaussian distributions here form the prevision model.

The problem during the operation of the keyboard control is that the reference data record, due to the dynamics of the neuronal activity described at the beginning, loses its accuracy rapidly—and that the prevision model thus deteriorates more and more. According to the invention, this is prevented by the continuous adaptation of the prevision model during operation. The entering signal vectors to be classified modify the prevision model and keep it up to date. In the example of the linear discriminant analysis, the Gaussian distributions can be adapted by the assumption that the entering signal vector represents the possible keys in the best way possible: average μ and covariance C of the distribution for every key are shifted towards the new entered signal vector Y, to an extent proportional to how probable its key is for Y according to the prevision model used so far. According to our schemes, this corresponds to an adaptive system in FIG. 1c. That this approach is working, is shown by FIGS. 7 and 8 (in this respect, ALDA is even better than LDA).

A disadvantage of this form of "unsupervised" adaptation is that even signal vectors classified incorrectly displace the prevision model into their direction. An optimized adaptation therefore, if at all possible, uses a signal that indicates, if the most recent classification was correct—i.e. the key desired by the patient was selected—or wrong. A possibility to measure such a signal is, in addition to Y, to measure the nerve activities of a brain area, in which correlatives for a neuronal error signal are present. Just like for the signal vector Y, they are transferred, by means of an amplifier, to a computer system, information-carrying components are extracted and an error signal E is generated. This can then be used in order to prevent the adaptation of the prevision model in the case of vectors classified incorrectly, or in order to adapt the model in the inverse direction. This corresponds to an adaptive system according to FIG. 3. That this approach works even better than ALDA, is shown by FIG. 7.

The invention claimed is:

1. Process for the computerized prevision of intended movements (X) from neuronal signals (Y) of a proband's brain, wherein the neuronal signals (Y) are associated each time with intended movements (X) in the brain,
    wherein the most likely movements (X) are determined based on detected neuronal signals (Y),
    namely using at least one model, wherein the at least one model describes a mapping (H) of neuronal signals (Y) on the possible intended movements (X), wherein the process comprises:
        a step in which the at least one model is updated, wherein the update takes place using the detected neuronal signals (Y) and without knowledge of the intended movement, and
        a step of the calculation of the currently most likely movement X with the at least one updated model
    wherein the at least one model (H) is determined each time by at least one characteristic and the at least one characteristic of the at least one model is updated in the updating step,
    wherein the at least one model (H) is an adaptive model (p(Y|X)) of Gauss distributed probabilities for a predetermined number, K, of classes of movements (X), wherein the at least one model comprises the average (mu_k) with k={1, . . . , K} as well as the covariance matrix (C_k) of the Gauss distribution as at least one characteristic, and in wherein the average (mu_k) of the predetermined classes of movement (X_1, . . . , X_k) is updated each time in the second step using a predetermined number (N) of detected signals (Y), and the covariance matrix (C) is updated using a predetermined number (N) of detected sianals (Y) and of the updated average,
    wherein the following applies for each of the probabilities p($X_k$|Y)):

$$p(X_k \mid Y) = \frac{p(X_k)p(Y \mid X_k)}{\sum_{k=1}^{K} p(Y \mid X_k)p(X_k)}$$

wherein k indicates the index of the class,
    for the averages the following applies:

$$\mu_k = \frac{1}{p(X_k)N} \sum_{i=1}^{N} p(X_k \mid Y_i) Y_i$$

and the following applies for the covariance:

$$C = \frac{1}{N-1} \sum_{k=1}^{K} \sum_{i=1}^{N} p(X_k \mid Y_i)(Y_i - \mu_k)((Y_i - \mu_k)^T.$$

2. Process according to claim 1, wherein the mapping (H) depending on the time (t) is updated additionally by a detected neuronal error signal (E).

3. Process according to claim 2, wherein an increment (α), which indicates the admitted change of the characteristic, is adapted anew in each updating step, especially on the basis of the error signal (E).

4. Process according to claim 1, wherein the mapping (H) depending on the time (t) in addition to the neuronal signals (Y) depends on states (Z) of the proband, wherein states are especially posture or attention.

5. Process according to claim 1, wherein the mapping (H) describes the probability of neuronal signals (Y) for the possible intended movements (X) and wherein an adaptation (W) of the neuronal signal (Y) is included in the at least one model, which before the updating step comprises the following:
    a step in which the current probabilities (p(X|Y)), with which a currently detected neuronal signal (Y) corresponds to the respective possible movements (X), are estimated.

6. Process according to claim 1, wherein an adaptation (W) of the neuronal signal (Y) enters into the calculation of the current probabilities in the first step, wherein the adaptation (W) considers a detected neuronal error signal (E) of the brain, which is generated in the brain of the proband, if the determined movement (X) does not coincide with the intended movement.

7. Process according to claim 1, wherein the update of the mapping (H) takes place by a regression process.

8. Process according to claim 1, wherein the update of the mapping (H) takes place by a classification process.

9. Process according to claim 1, wherein the update of the characteristics of the model (H) takes place within preset maximums and minimums.

10. Process according to claim 1, wherein the at least one model is an adaptive model (p(Y|X)) with a function (H) of the intended movement (X) plus a noise component (Ny), wherein the at least one characteristic (h1, h2, . . . , hn) comprises coefficients of the function (H), and wherein the coefficients are updated each time in the second step using a predetermined number (N) of detected signals (Y).

11. Process according to claim 10, wherein the noise component (Ny) corresponds to Gaussian noise or can be represented by a gamma distribution, or wherein the function (H) of the intended movement (X) is a linear function.

12. Process according to claim 10, wherein the characteristics of the function (H) of the movement (X) together with the movement (X) are carried out by a joint-estimation procedure with the help of an unscented Kalman filter with augmented state space.

13. Process according to claim 1, wherein a model (F) for the movement is additionally assumed, in which the prevision takes place at predetermined moments ( . . . , t−1, T, t+1, . . . ) and, according to the additional model (F), a detected neuronal signal (Y) is represented at a predetermined time (t) as a predetermined function (H) of a movement (X) at the moment (t) as well as a first noise component (Ny), and wherein the movement (X) is represented at the predetermined moment (t) as a function (F) of a movement at an earlier moment (t−1) as well as a second noise component (Nx).

14. Process according to claim 13, wherein the increment (α), with the help of which the change of the characteristics takes place, is calculated from the movement estimations of the predetermined function (H) and of the additional model (F).

15. Process according to claim 1, wherein additionally at least one model (G) is used which describes the probability of the movements (p(X|Z)) depending on proband's states (Z), in which states are especially posture or attention.

16. Process according to claim 1, wherein additionally at least one model (J) is used which describes the probability of the movements (p(X|O)) depending on the local conditions (O), wherein local conditions especially concern the proband's position in the room and the subject matters and persons in the proband's environment.

17. Process according to claim 1, wherein the determined movement (X) is transmitted to the proband in such a way that the proband can detect it by means of sensors.

18. Process according to claim 1, wherein the steps are run through several times.

19. Device for carrying out the method according to claim 1.

20. Process for the computerized control of an output actuator having a computer interface, in order to execute a movement intended by a proband (X), wherein the movement to be performed (X) is determined on the basis of detected neuronal signals (Y) of the proband by the process according to claim 1.

21. Process according to claim 20, wherein the detected neuronal signals (Y) include information-carrying components that lie in frequency ranges of less than 10 Hz and between 40 and 160 Hz.

22. Process according to claim 21, wherein the information-carrying components include amplitudes and or phases of the signals.

23. Process according to claim 20, wherein the actuator is a prosthesis or a computer-input device.

24. Non-transitory computer-readable medium with programme code which executes the process according to claim 1 when loaded into a computing device.

25. Apparatus for computerized control of an output adapter having a computer interface in order to execute a movement intended by proband (X), showing the following: a computer system, having a processor, memory, a user interface, a network interface, and a sensor interface, for processing detected neuronal signals (Y), wherein the computer system determines the movement to be performed (X) by the output actuator on the basis of detected neuronal signals (Y) of the proband by application of the process according to claim 1.

26. Apparatus according to claim 25, further comprising: the output actuator having the computer interface, especially a prosthesis or a computer input device, wherein the actuator is formed for carrying out the detected movement.

27. Process for the computerized prevision of intended movements (X) from neuronal signals (Y) of a proband's brain, wherein the neuronal signals (Y) are associated each time with intended movements (X) in the brain,
wherein the most likely movements (X) are determined based on detected neuronal signals (Y),
namely using at least one model, wherein the at least one model describes a mapping (H) of neuronal signals (Y) on the possible intended movements (X), wherein the process comprises:
a step in which the at least one model is updated, wherein the update takes place using the detected neuronal signals (Y) and without knowledge of the intended movement and
a step of the calculation of the currently most likely movement X with the at least one updated model
wherein the mapping (H) describes the probability of neuronal signals (Y) for the possible intended movements (X) and wherein an adaptation (W) of the neuronal signal (Y) is included in the at least one model, which before the updating step comprises the following:
a step in which the current probabilities (p(X|Y)), with which a currently detected neuronal signal (Y) corresponds to the respective possible movements (X), are estimated,
herein the following applies for at least one of the probabilities:

$$p(X_k \mid Y, E) = \frac{p(X_k) p(Y, E \mid X_k)}{p(Y, E)},$$

and wherein in the case of an error signal (E) which is independent of the neuronal signal (Y) the following applies:

$$p(X_k \mid Y, E) = \frac{p(X_k) p(Y \mid E_k)}{p(Y, E)} p(E \mid X_k).$$

28. Process according to claim 27, wherein the signals (Y, E) are further processed by a Brain Machine Interface for the calculation of the movements (X).

29. Process according to claim 27, wherein signals for controlling the movements (X) of corresponding prostheses are obtained on the basis of the calculated movements (X).

30. Process according to claim 27, wherein the detected neuronal signals (Y, E) exist in electronically processable form outside of the human body.

31. Process for the computerized control of an output actuator having a computer interface, in order to execute a movement intended by a proband (X), wherein the movement to be performed (X) is determined on the basis of detected neuronal signals (Y) of the proband by the process according to claim 27.

32. Non-transitory computer readable medium with programme code which executes the process according to claim 27 when loaded into a computing device.

33. Apparatus for computer computerized control of an output actuator having a computer interface in order to execute a movement intended by a proband (X), showing the following: a computer system, having a processor, memory, a user interface, a network interface, and a sensor interface, for processing detected neuronal signals (Y), wherein the computer system determines the movement to be performed (X) by the output actuator on the basis of detected neuronal signals (Y) of the proband by application of the process according to claim 27.

* * * * *